(12) United States Patent
Perdulak et al.

(10) Patent No.: US 12,549,101 B2
(45) Date of Patent: Feb. 10, 2026

(54) DC HOUSEHOLD APPLIANCE WITH A SWITCHING CIRCUIT

(71) Applicant: BSH Hausgeräte GmbH, Munich (DE)

(72) Inventors: Jan Perdulak, Vel'ke Revistia (SK); Miroslav Tulenko Dzivy, Presov (SK)

(73) Assignee: BSH Hausgeräte GmbH, Munich (DE)

( * ) Notice: Subject to any disclaimer, the term of this patent is extended or adjusted under 35 U.S.C. 154(b) by 395 days.

(21) Appl. No.: 18/176,613

(22) Filed: Mar. 1, 2023

(65) Prior Publication Data
US 2023/0283181 A1 Sep. 7, 2023

(30) Foreign Application Priority Data
Mar. 1, 2022 (EP) ..................................... 22159321

(51) Int. Cl.
*H02M 3/155* (2006.01)
*H02H 7/20* (2006.01)
*H02M 1/08* (2006.01)

(52) U.S. Cl.
CPC .............. *H02M 3/155* (2013.01); *H02H 7/20* (2013.01); *H02M 1/08* (2013.01)

(58) Field of Classification Search
CPC . H02M 3/155; H02H 7/20; H02H 5/00; H02J 2310/14; H02J 1/06
See application file for complete search history.

(56) References Cited

U.S. PATENT DOCUMENTS

| | | | | | |
|---|---|---|---|---|---|
| 5,237,140 | A | * | 8/1993 | Akazawa | H05B 6/64 363/19 |
| 5,331,128 | A | * | 7/1994 | Koh | H05B 6/6417 219/722 |
| 6,448,541 | B1 | * | 9/2002 | Lim | H05B 6/80 219/715 |
| 6,852,959 | B1 | * | 2/2005 | Han | H05B 6/6417 219/722 |
| 7,064,306 | B2 | * | 6/2006 | Shin | H05B 6/666 219/718 |
| 8,314,516 | B2 | * | 11/2012 | Federmann | H02J 9/005 307/125 |
| 12,018,422 | B2 | * | 6/2024 | Quinn | H02P 27/04 |
| 2006/0162744 | A1 | * | 7/2006 | Walkden | A47L 15/4227 134/25.2 |
| 2010/0251776 | A1 | * | 10/2010 | Bischoff | D06F 34/10 333/167 |

FOREIGN PATENT DOCUMENTS

CN 206960931 * 2/2018

* cited by examiner

Primary Examiner — Kyle J Moody
(74) Attorney, Agent, or Firm — Laurence A. Greenberg; Werner H. Stemer; Ralph E. Locher

(57) ABSTRACT

A household appliance contains a DC power supply configured to provide a DC supply voltage between a first DC supply line and a second DC supply line from an external DC supply, which is external to the household appliance. Furthermore, the appliance contains an electrical component which is configured to be operated by the DC supply voltage. The appliance further contains at least one DC switching circuit having a semiconductor-based switching element which is configured to galvanically interrupt the first DC supply line or the second DC supply line in reaction to a control signal.

14 Claims, 4 Drawing Sheets

DC HOUSEHOLD APPLIANCE WITH A SWITCHING CIRCUIT

CROSS-REFERENCE TO RELATED APPLICATION

This application claims the priority, under 35 U.S.C. § 119, of European Patent Application EP22159321.3, filed Mar. 1, 2022; the prior application is herewith incorporated by reference in its entirety.

FIELD AND BACKGROUND OF THE INVENTION

The present document relates to a switching circuit for a household appliance, in particular for a DC (direct current) household appliance.

A housing appliance, such as a washing machine, a dishwasher or a refrigerator, is typically powered by an AC (alternate current) voltage. The household appliance may contain one or more switching circuits which are configured to galvanically decouple the household appliance or an electric component of the household appliance from the AC voltage.

SUMMARY OF THE INVENTION

It is expected that in the future, DC household appliances will be available which are directly powered by a DC voltage which is provided by an external DC power supply. The present document addresses the technical problem of providing an efficient and reliable switching circuit for a DC household appliance, in particular such that the switching circuit allows for a one-to-one replacement of a corresponding switching circuit for an AC household appliance. The technical problem is solved by the independent claim. Preferred examples are described in the dependent claims.

According to an aspect, a household appliance, in particular a DC household appliance, is described. The household appliance may contain or may be a dishwasher, an oven, a washing machine, a dryer, a beverage machine (such as a coffee machine), a kitchen and/or cooking machine, and/or a vacuum cleaner. The DC household appliance is configured to be operated based on a DC supply voltage that is provided by an external DC supply, which is external to the household appliance. The DC supply voltage is preferably 100 V or higher, in particular 200 V or higher. Furthermore, the DC household appliance may be configured such that it is transformable into a corresponding AC household appliance in an efficient manner.

The appliance contains a DC power supply which is configured to provide the DC supply voltage between a first DC supply line (e.g., a DC+ line) and a second DC supply line (e.g., a DC− line) from the external DC supply. By way of example, the appliance may contain a power plug for coupling the DC supply lines with a corresponding power plug of the external DC supply. The first and second DC supply lines may be directly connected to the power plug of the appliance.

Furthermore, the appliance contains an electrical component, in particular an electrical power component, which is configured to be operated by the DC supply voltage (possibly without the need of performing a (DC/DC) voltage conversion). The household appliance may comprise a processing room configured to take up an item (e.g., a dish, a food item or clothes) which is processed by the household appliance. Example processing, which is performed within the processing room, may be: washing, cleaning, drying, baking, cooking, brewing, etc. The processing room may be the drum of a washing machine or dryer, or may be the inside of a dishwasher or oven. The electrical component may be configured to provide a processing function (such as heating, pumping or actuating) which contributes to or which corresponds to the processing of the item within the processing room.

By way of example, the electrical component may comprise or may be a heater configured to heat a fluid (e.g., water or air) and/or to heat the processing room of the household appliance. Alternatively, or in addition, the electrical component may comprise or may be an electrical motor configured to move a mechanical component (e.g., the drum) of the household appliance. Alternatively, or in addition, the electrical component may comprise or may be an electrical pump or ventilator configured to pump a fluid (e.g., water or air) into and/or out of a processing room of the household appliance. The electrical component may be such that the electrical component consumes 20% or more, in particular 50% or more, of the total electrical power consumption of the appliance (in average). Alternatively, or in addition, the electrical component may be a power component of the appliance.

The electrical component may be configured to be operated both by the DC supply voltage and by an AC supply voltage (e.g., a 230 V voltage) between a first AC supply line (e.g., a phase line) and a second AC supply line (e.g., a neutral line). As such, the same electrical component may be used within the DC variant and the AC variant of the household appliance.

Furthermore, the appliance contains at least one DC switching circuit containing a semiconductor-based switching element which is configured to galvanically interrupt the first DC supply line or the second DC supply line in reaction to a control signal. The switching element may include a transistor, in particular a field effect transistor (FET) such as a metaloxide semiconductor (MOS) FET. The switching circuit may be a power-off circuit.

By making use of a semiconductor-based switching element within the switching circuit of a DC household appliance, power-off switching may be provided in a safe and efficient manner.

As indicated above, the household appliance may be configured such that the DC variant and the AC variant of the appliance may be provided in an efficient manner. In particular, the household appliance may be configured such that the DC household appliance is transformable into a corresponding AC household appliance (solely) by replacing the DC power supply by a corresponding AC power supply configured to provide the AC supply voltage from an external AC supply (e.g., a 230V supply), and by replacing the DC switching circuit by a corresponding AC switching circuit (e.g., comprising a mechanical relay). As a result of this, AC and DC variants of a household appliance may be provided in a particularly efficient manner.

The household appliance may contain a first safety DC switching circuit (notably a DC power-off circuit) which contains a semiconductor-based switching element that is arranged between a first external DC supply line directly coupled with the external DC supply (e.g., via a power plug) and a first internal DC supply line coupled with the electrical component. The switching element of the first safety DC switching circuit may be configured to galvanically couple the first external DC supply line with or to galvanically decouple the first external DC supply line from the first internal supply line, in dependence of a safety control signal.

Alternatively, or in addition, the household appliance may comprise a second safety DC switching circuit (notably a DC power-off circuit) containing a semiconductor-based switching element that is arranged between a second external DC supply line directly coupled with the external DC supply (e.g., via a power plug) and a second internal DC supply line coupled with the electrical component. The switching element of the second safety DC switching circuit may be configured to galvanically couple the second external DC supply line with or to galvanically decouple the second external DC supply line from the second internal supply line, in dependence of a safety control signal.

Hence, the appliance may comprise one or more switching circuits for providing safety power-off switching. For this purpose, the household appliance may comprise a control unit which is configured to detect a safety relevant state of the household appliance. The safety relevant state may comprise a malfunction of the household appliance and/or an open state of the processing room (notably of the door of the processing room) of the household appliance. In reaction to this, a safety control signal may be generated, which is directed at opening the switching element of the first safety DC switching circuit and/or of the second safety DC switching circuit. As a result of this, a safe operation of the household appliance is enabled. In particular, the appliance may be decoupled from the external DC supply in an efficient and reliable manner.

The household appliance may comprise an operation DC switching circuit containing a semiconductor-based switching element that is arranged between the first internal DC supply line and the electrical component. The operation DC switching circuit may change its state (between on-state and off-state), possibly repeatedly, during operation of the household appliance. The electrical component may be arranged between the first internal DC supply line and the second internal DC supply line. The switching element of the operation DC switching circuit may be configured to galvanically couple the first internal DC supply line with or to galvanically decouple the first internal DC supply line from the electrical component, in dependence of an operation control signal. The control unit may be configured to generate the operation control signal in dependence of an operating program of the household appliance for providing a processing function of the electrical component. Hence, the electrical component may be operated in an efficient and reliable manner using the DC supply voltage.

A DC switching circuit of the household appliance may comprise a control circuit which is configured to generate a drive signal for opening or closing the semiconductor-based switching element in dependence of the control signal. The control circuit may comprise a control transistor which is arranged between a control voltage and a reference voltage and which is opened or closed in dependence of the control signal. In a preferred example, the drive signal is configured to open or close a mechanical relay which replaces the semiconductor-based switching element in a corresponding AC household appliance. As a result of this, an AC and a DC variant of the appliance may be provided in a particular efficient manner (as the control circuit of the one or more switching circuits may be used in both variants).

The DC switching circuit may comprise drive circuitry which is configured to convert the drive signal into a gate signal for controlling the semiconductor-based switching element of the DC power-of circuit. The drive circuitry may comprise a DC/DC power converter, in particular a galvanically isolated DC/DC power converter, which is configured to adapt the voltage level of the drive signal (providing an output signal at a different voltage level than the drive signal). By making use of a DC/DC power converter, a DC switching circuit for replacing a corresponding AC switching circuit may be provided in a particular efficient and reliable manner.

The drive circuitry may further comprise a drive unit which is configured to generate the gate signal based on the output signal of the DC/DC power converter, thereby controlling the semiconductor-based switching element in a reliable manner.

It should be noted that the systems including its preferred embodiments as outlined in the present document may be used stand-alone or in combination with the other systems disclosed in this document. In addition, the features outlined in the context of a system are also applicable to a corresponding method. Furthermore, all aspects of the systems outlined in the present document may be arbitrarily combined. In particular, the features of the claims may be combined with one another in an arbitrary manner.

Other features which are considered as characteristic for the invention are set forth in the appended claims.

Although the invention is illustrated and described herein as embodied in a DC household appliance with a switching circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
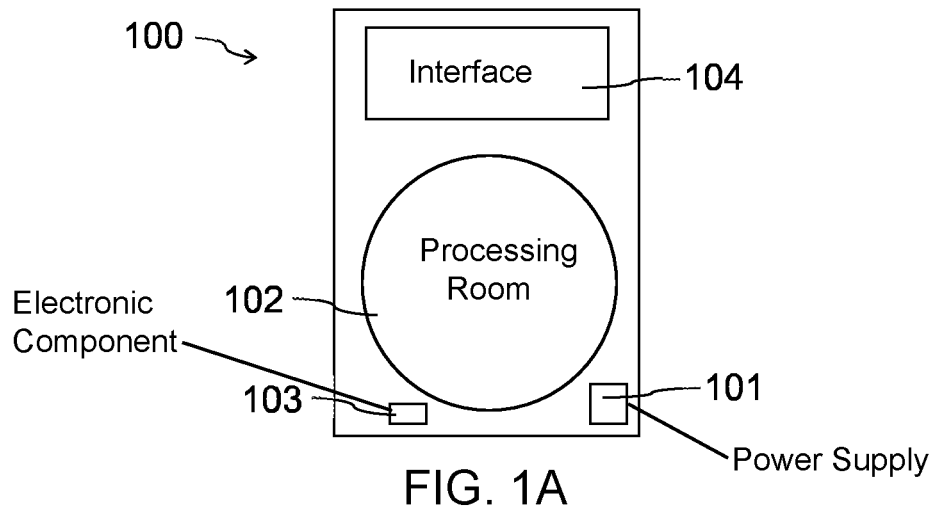
FIG. 1A is an illustration showing an example household appliance.

As outlined above, the present document is directed at providing an efficient and reliable DC switching circuit for a DC household appliance, in particular such that it allows for a one-to-one replacement of a corresponding AC switching circuit in a corresponding AC household appliance. In this context FIG. 1A shows an example household appliance 100 which may comprise an electronic user interface 104 and a processing chamber or room 102 for processing one or more items, such as dishes in case of a dishwasher, a food item in case of an oven, or clothes in case of a washing machine or dryer. Furthermore, the appliance 100 has one or more electrical components 103 which are configured to provide a processing function for processing the one or more items within the processing room 102. Example electrical components 103 are: a heater for heating up the processing room 102 or water used within the processing room 102, or an electrical motor for rotating a washing drum of a washing machine, or an electrical pump for pumping water into or out off the processing room 102.

The household appliance 100 may further comprise a power supply 101 which is configured to provide electrical power to the different electrical and/or electronic components 103, 104 of the household appliance 100. The electrical power may be derived from an external alternating current (AC) supply (such as a 230V AC supply). In such a case, the power supply 101 may comprise one or more AC/DC power converters configured to provide a DC current to one or more DC components of the appliance 100 (such as the electronic user interface 104). Furthermore, an AC current may be provided to one or more electrical components 103 of the appliance 100, which may be operated using an AC current (such as the heater).

Figure 1B:
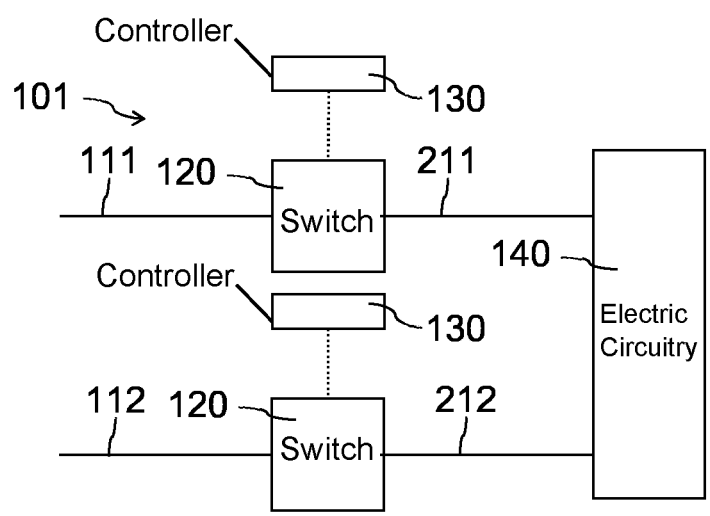
FIG. 1B is a block diagram showing an example power supply of the household appliance.

FIG. 1B shows an example AC power supply 101 for an AC appliance 100. The power supply 101 contains a first AC supply line 111 (e.g., a phase line) and a second AC supply line 112 (e.g., a neutral line), each conducting an AC current. For safety reasons, the power supply 101 typically contains AC switching elements 120 on one or more of the supply lines 111, 112. An AC switching element 120 may be configured to galvanically interrupt the respective AC supply line 111, 112. For this purpose, the AC switching element 120 may comprise or may be a relay which is controlled using a control circuit 130.

As indicated above, the power supply 101 of the household appliance 100 is configured to supply electrical circuitry 140 of the household appliance 100, where in the electrical circuitry 140 comprises one or more electrical components 103. The one or more AC switching elements 120 may be controlled to interrupt the respective one or more AC supply lines 111, 112 in dependence of the state of the appliance 100. By way of example, if it is detected that the processing room 102 of the appliance 100 is open (because the door to the processing room 102 is open), the one or more AC switching elements 120 may be controlled to be open, thereby galvanically decoupling the AC supply from the electrical circuitry 140 and thereby increasing the safety of the household appliance 100.

Figure 1C:
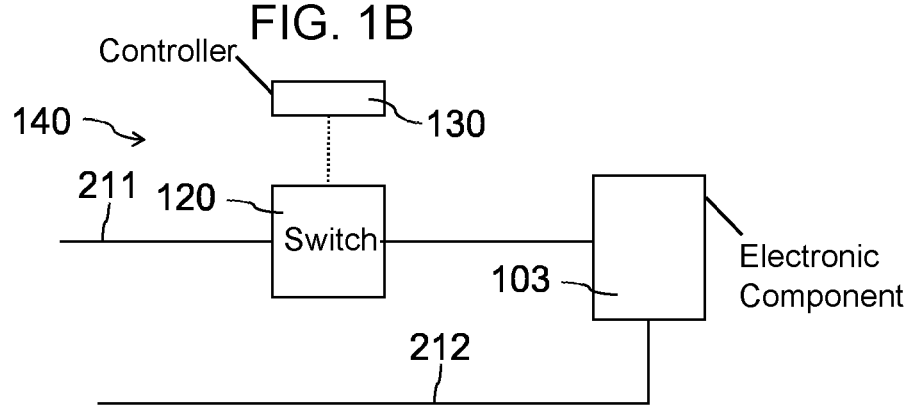
FIG. 1C is a block diagram showing an example electrical component of the household appliance.

The household appliance 100 may further comprise one or more AC switching elements 120 for turning on or off an electrical component 103, e.g., a heater (as shown in FIG. 1C), in the context of the operation of the electrical component 103. The control circuit 130 may be configured to close the AC switching element 120 (e.g., the relay) to provide a galvanically conducting connection between the first supply line 211 and the electrical component 103, thereby turning on the electrical component 103. Furthermore, the control circuit 130 may be configured to open the AC switching element 120 to galvanically interrupt the connection between the first supply line 211 and the electrical component 103, thereby turning off the electrical component 103. Hence, the electrical component 103 may be turned on and off in a reliable manner during operation of the household appliance 100.

Safety powering-off switching, as illustrated in FIG. 1B, is an important safety part of an AC home appliance 100 powered by AC voltage (e.g., a washing machine, an oven, a dryer, etc.). In case of a malfunction of the appliance 100 (e.g., a freeze of the microcontroller of the appliance 100) power-off switching (using the one or more AC switching elements 120) ensures the disconnection of the phase conductor (L) 111 and/or the neutral conductor (N) 112 of the AC supply from the appliance 100. A relay is typically used as an AC switching element 120 of an AC home appliance 100.

Furthermore, an AC appliance 100 may comprise one or more electrical components 103, such as a heater, which are powered by an AC voltage. A relay may be used to turn on and off an AC powered electrical component 103 (as illustrated in FIG. 1C).

A relay typically cannot be used in case of DC switching, due to the occurrence of undesired effects during the turn-off process. During operation of a DC home appliance a relatively large current flows through an AC switching element 120 of the appliance 120. Turning-off the relay of the AC switching element 120 under load causes an undesirable arcing between the contacts of the relay, eventually leading to contacts that weld shut or contacts that fail due to a buildup of surface damage caused by the destructive arc energy. Solid-state relays (SSR) may be used for switching of DC loads, however, SSRs are typically quite costly.

In the present document, a switching circuit is described which allows for an efficient and reliable safety power-off switching and/or a reliable control switching of a DC current within a DC household appliance 100.

Figure 2A:
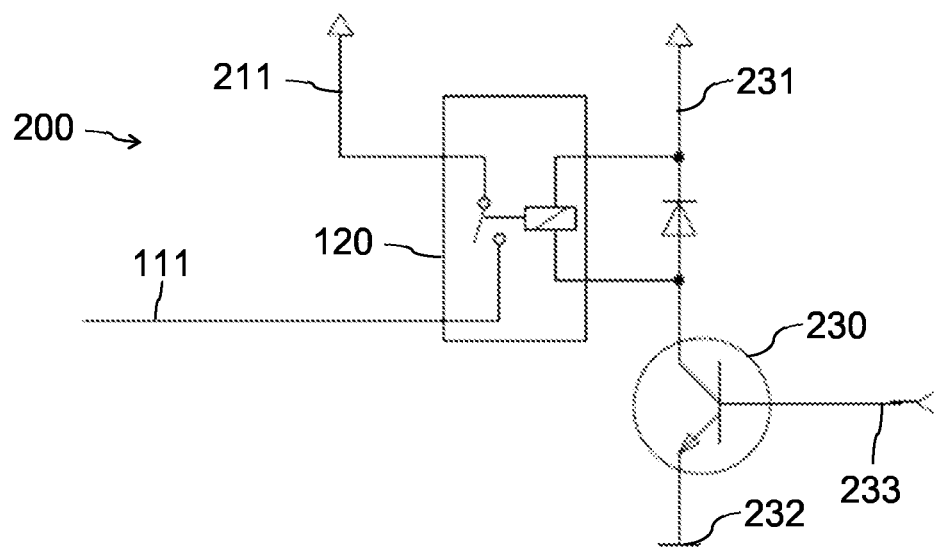
FIG. 2A is a circuit diagram showing example AC switching circuits for the supply lines of the AC household appliance.
Figure 2A:
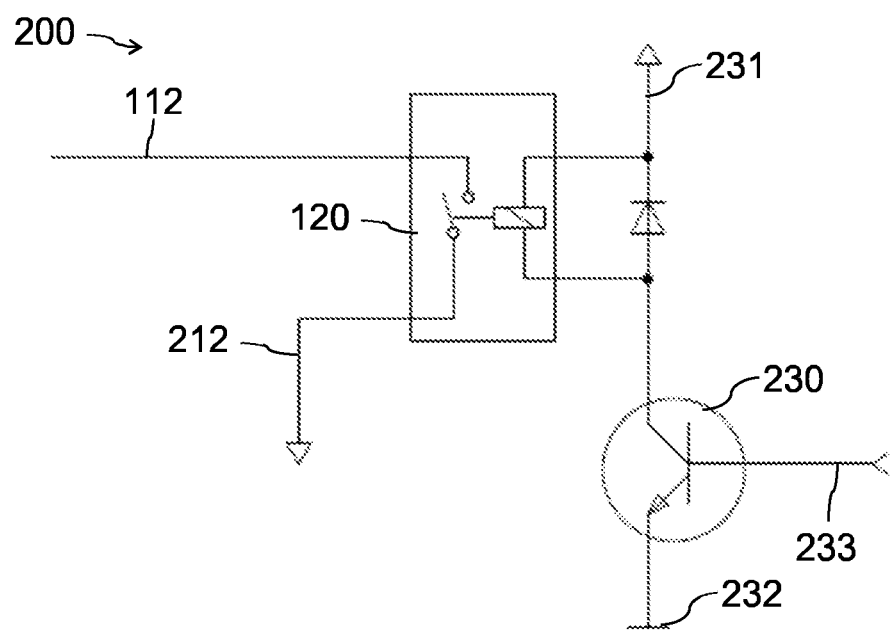

FIG. 2A shows safety switching circuits 200 for an AC appliance 100, wherein a (safety) switching circuit 200 comprises an AC switching element 120 (in particular a relay) and a control circuit 130 for controlling the AC switching element 120. A safety switching circuit 200 may also be referred to as a power-off circuit. The control circuit 130 may comprise a control transistor 230 which is controlled using a control signal 233. The control transistor 230 may be arranged between a control voltage 231 and a reference voltage 232 (e.g., ground). The control transistor 230 may be configured to apply the control voltage 231 to the AC switching element 120 for closing the AC switching element 120, and to decouple the control voltage 231 from the AC switching element 120 for opening the AC switching element 120.

FIG. 2A shows a (safety) switching circuit 200 for the first AC supply line 111, 211, which is configured to galvanically interrupt the first AC supply line 111, 211. Furthermore, FIG. 2A shows a (safety) switching circuit 200 for the second AC supply line 112, 212, which is configured to galvanically interrupt the second AC supply line 112, 212.

Figure 2B:
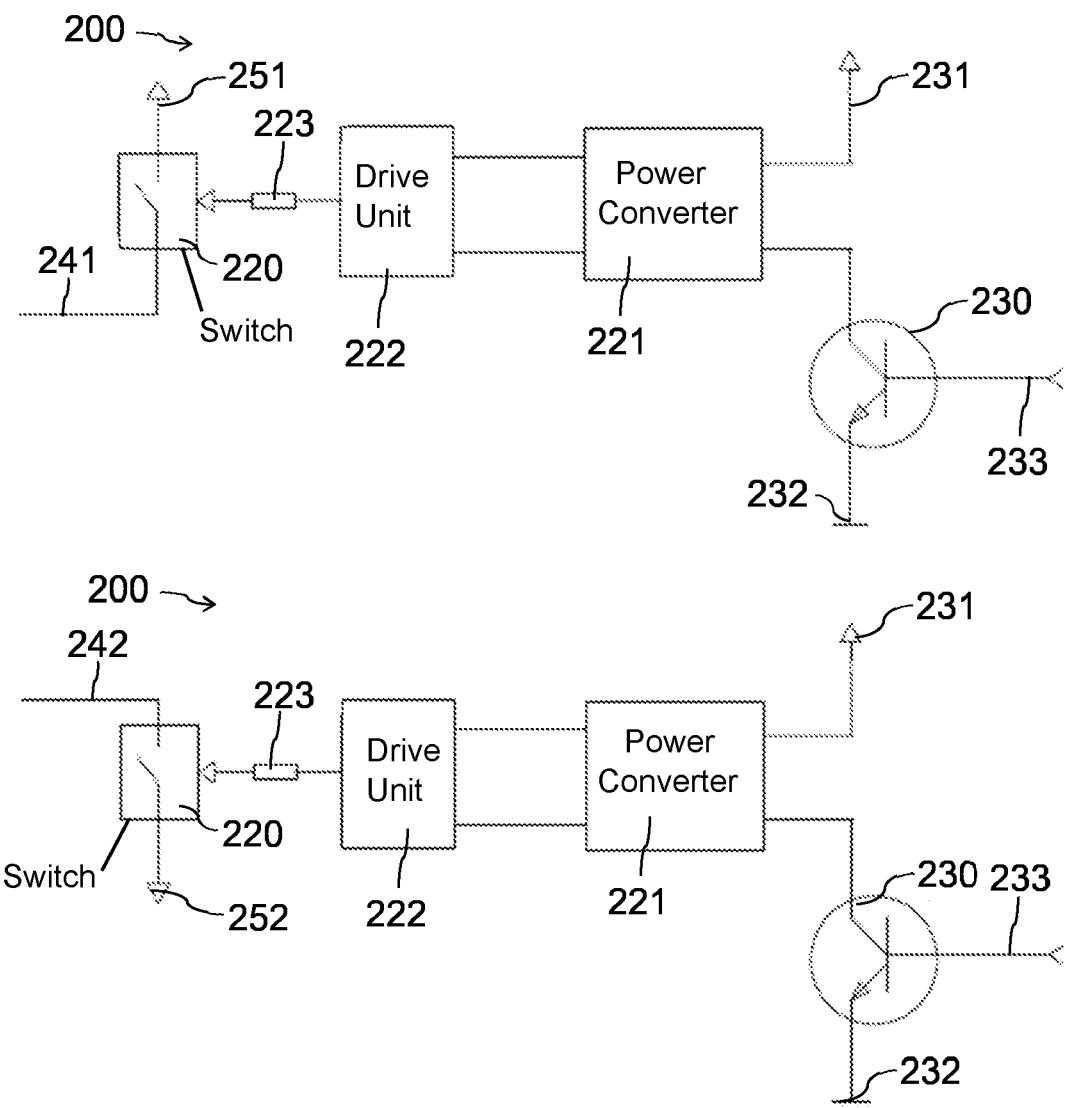
FIG. 2B is a circuit diagram showing example DC switching circuits for the supply lines of a DC household appliance.

As illustrated in FIG. 2B, the AC switching element 120 may be replaced by a semiconductor-based switching element 220, such as a metaloxide semiconductor (MOS) field effect transistor (FET). The semiconductor-based switching element 220 is configured to galvanically interrupt a DC supply line 241, 251 (or 242, 252). The drive circuitry for controlling the semiconductor-based switching element 220 may comprise a galvanically isolated DC/DC power converter 221 which may comprise a transformer for galvanic isolation. The DC/DC power converter 221 may be configured to transfer the drive voltage (generated by the control transistor 230) to the drive unit 222 for driving the semiconductor-based switching element 220. Furthermore, the DC/DC power converter 221 may be configured to adjust the level of the drive voltage to the requirements of the drive unit 222. The drive unit 222 may be coupled to the control pin (notably to the gate) of the semiconductor-based switching element 220, e.g., via a resistor 223.

FIG. 2B illustrates a (safety) switching circuit 200 for the first DC supply line 241, 251 (e.g., for the DC+ voltage), which is configured to galvanically interrupt the first DC supply line 241, 251. Furthermore, FIG. 2B shows a (safety) switching circuit 200 for the second DC supply line 242, 252 (e.g., for the DC− voltage), which is configured to galvanically interrupt the second supply line 242, 252.

The switching circuits 200 in FIG. 2B may be used to replace the corresponding AC switching circuits 200 of FIG. 2A in a one-by-one manner, without the need for replacing the control circuit 130 containing the control transistor 230. In particular, the AC switching element 120 (notably the mechanical relay) may be replaced by the semiconductor-based switching element 220 and drive circuitry 221, 222, 223 for operating the semiconductor-based switching element 220.

Figure 3A:
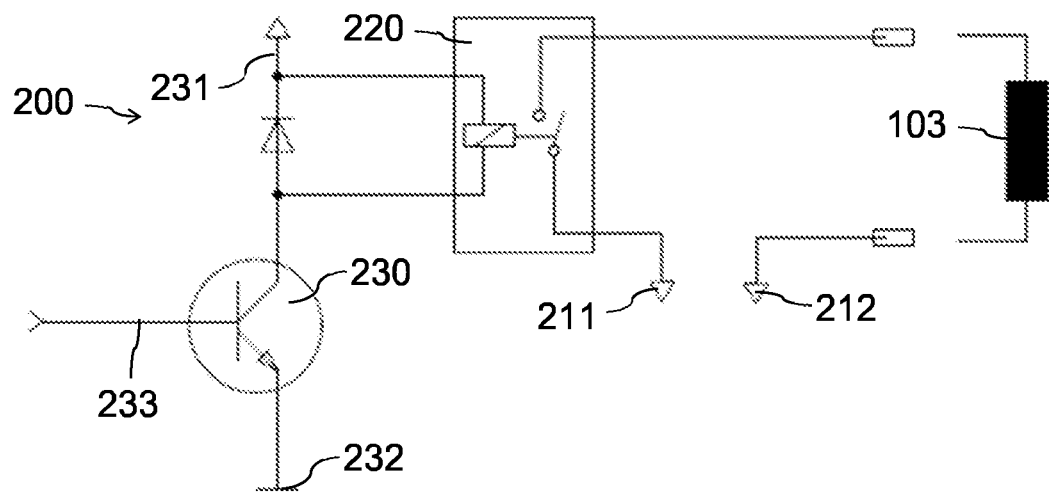
FIG. 3A is a circuit diagram showing an example AC switching circuit for the supply of an electrical component of an AC household appliance.
Figure 3B:
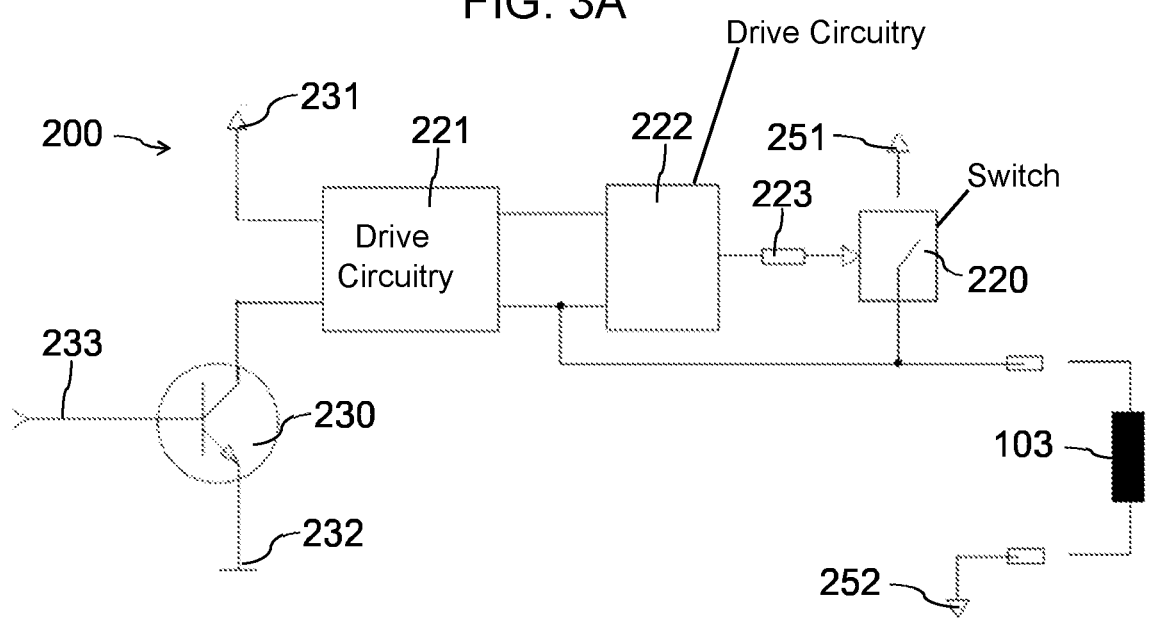
FIG. 3B is a circuit diagram showing an example DC switching circuit for the supply of an electrical component of a DC household appliance.

FIG. 3A shows an (operation) AC switching circuit 200 for operating an electrical component 103, in particular a heater, of the appliance 100. In FIG. 3A the electrical component 103 is operated using an AC current between the first AC supply line 211 and the second AC supply line 212. FIG. 3B shows a corresponding (operation) DC switching circuit 200 with a semiconductor-based switching element 220 and its drive circuitry 221, 222, 223 for operating the electrical component 103 using a DC current between the first DC supply line 251 and the second DC supply line 252.

Hence, a DC switching circuit 200 is described, which can be used for replacing a corresponding AC switching circuit 200. In particular, the DC switching circuit 200 may be used for power switching of the DC+ and/or DC-supply lines 241, 242 and for galvanic isolation of the input power part of a household appliance 100 from the internal parts of household appliance 100. Alternatively, the DC switching circuit 200 may be used for power switching of a load 103 and for galvanic isolation of the load 103.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A household appliance, comprising:
   a DC power supply having a first external DC supply line, a second external DC supply line and configured to provide a DC supply voltage between said first external DC supply line and said second external DC supply line from an external DC supply, which is external to the household appliance;
   an electrical component configured to be operated by the DC supply voltage;
   at least one DC switching circuit configured to galvanically interrupt said first external DC supply line or said second external DC supply line in reaction to a control signal, said at least one DC switching circuit including:
   a first safety DC switching circuit containing a first semiconductor-based switching element disposed between said first external DC supply line directly coupled with the external DC supply and a first internal DC supply line coupled with said electrical component, wherein said first semiconductor-based switching element of said first safety DC switching circuit is configured to galvanically couple said first external DC supply line with or to galvanically decouple said first external DC supply line from said first internal supply line, in dependence on the control signal; and/or
   a second safety DC switching circuit containing a second semiconductor-based switching element disposed between said second external DC supply line directly coupled with the external DC supply and a second internal DC supply line coupled with said electrical component, wherein said second semiconductor-based switching element of said second safety DC switching circuit is configured to galvanically couple said second external DC supply line with or to galvanically decouple said second external DC supply line from said second internal supply line, in dependence on the control signal;
   a processing room;
   a controller configured to detect a safety relevant state of the household appliance and:
   in reaction to the safety relevant state, said controller generating the control signal being a safety control signal which is directed at opening said first semiconductor-based switching element of said first safety DC switching circuit and/or opening said second semiconductor-based switching element of said second safety DC switching circuit; and
   the safety relevant state including: a malfunction of the household appliance and an open state of said processing room of the household appliance.

2. The household appliance according to claim 1,
   wherein said electrical component is disposed between said first internal DC supply line and said second internal DC supply line; and
   wherein said first semiconductor-based switching element of said at least one DC switching circuit is configured to galvanically couple said first internal DC supply line with or to galvanically decouple said first internal DC supply line from said electrical component, in dependence of an operation of the control signal.

3. The household appliance according to claim 2, wherein said controller configured to generate the control signal in dependence of an operating program of the household appliance for providing a processing function of said electrical component.

4. The household appliance according to claim 1, wherein:
   said controller is configured to generate a drive signal for opening or closing said first and second semiconductor-based switching elements in dependence on the control signal.

5. The household appliance according to claim 4, wherein:
   said at least one DC switching circuit has drive circuitry configured to convert the drive signal into a gate signal for controlling said first and second semiconductor-based switching elements; and
   said drive circuitry has a DC/DC power converter configured to adapt a voltage level of the drive signal.

6. The household appliance according to claim 5, wherein said drive circuitry includes a drive unit configured to generate the gate signal based on an output signal of said DC/DC power converter.

7. The household appliance according to claim 5, wherein said DC/DC power converter is a galvanically isolated DC/DC power converter.

8. The household appliance according to claim 4, wherein said controller has a control transistor which is disposed between a control voltage and a reference voltage and which is opened or closed in dependence on the control signal.

9. The household appliance according to claim 1, wherein the DC supply voltage is 100 V or higher.

10. The household appliance according to claim 1,
a wherein said processing room is configured to take up an item which is processed by the household appliance; and
wherein said electrical component is configured to provide a processing function contributing to a processing of the item within said processing room.

11. The household appliance according to claim 10, wherein said electrical component contains:
a heater configured to heat a fluid and/or to heat said processing room of the household appliance;
an electrical motor configured to move a mechanical component of the household appliance; and/or
an electrical pump configured to pump a fluid into and/or out of said processing room of the household appliance.

12. The household appliance according to claim 1, further comprising a first AC supply line and a second AC supply line, wherein said electrical component is configured to be operated both by the DC supply voltage and by an AC supply voltage between said first AC supply line and said second AC supply line.

13. The household appliance according to claim 1, wherein the household appliance is configured such that the household appliance is transformable into a corresponding AC household appliance by:
replacing said DC power supply by a corresponding AC power supply configured to provide an AC supply voltage from an external AC supply; and
replacing said at least one DC switching circuit by a corresponding AC switching circuit.

14. The household appliance according to claim 1, wherein the household appliance is selected from the group consisting of a dishwasher, an oven, a washing machine, a dryer, a beverage machine, a kitchen and a cooking machine.

* * * * *